US009961836B2

(12) United States Patent
Demon et al.

(10) Patent No.: US 9,961,836 B2
(45) Date of Patent: May 8, 2018

(54) BALING CHAMBER

(71) Applicant: CNH Industrial America LLC, New Holland, PA (US)

(72) Inventors: Frederik Demon, Bruges (BE); Johan O. Vanpoucke, Veldegem (BE); Tom Coen, Zemst (BE); Didier Verhaeghe, Ypres (BE)

(73) Assignee: CNH Industrial America LLC, New Holland, PA (US)

( * ) Notice: Subject to any disclaimer, the term of this patent is extended or adjusted under 35 U.S.C. 154(b) by 358 days.

(21) Appl. No.: 14/890,558

(22) PCT Filed: May 13, 2014

(86) PCT No.: PCT/EP2014/059749
§ 371 (c)(1),
(2) Date: Nov. 11, 2015

(87) PCT Pub. No.: WO2014/184185
PCT Pub. Date: Nov. 20, 2014

(65) Prior Publication Data
US 2016/0088799 A1  Mar. 31, 2016

(30) Foreign Application Priority Data

May 13, 2013  (BE) .................................. 2013/0334

(51) Int. Cl.
*A01F 15/04* (2006.01)
*A01F 15/07* (2006.01)
*A01F 15/08* (2006.01)
*B30B 15/34* (2006.01)

(52) U.S. Cl.
CPC .......... *A01F 15/0825* (2013.01); *A01F 15/04* (2013.01); *A01F 15/046* (2013.01); *A01F 15/07* (2013.01); *A01F 15/0883* (2013.01); *A01F 2015/0795* (2013.01); *B30B 15/34* (2013.01)

(58) Field of Classification Search
CPC ...... A01F 15/04; A01F 15/1025; A01F 15/07; A01F 15/046; A01F 15/0883; A01F 2015/0795; A01F 12/48; A01F 12/444; B30B 15/34
USPC ......................................... 100/179, 191, 317
See application file for complete search history.

(56) References Cited

U.S. PATENT DOCUMENTS

| 3,827,213 A | * | 8/1974 | Matzinger ........... B29B 17/0026 |
| | | | 100/179 |
| 7,975,607 B2 | | 7/2011 | Hoover et al. |
| 2011/0094396 A1 | * | 4/2011 | Borrelli ................... A01F 15/04 |
| | | | 100/45 |

FOREIGN PATENT DOCUMENTS

DE          2130216 A1    12/1972

* cited by examiner

*Primary Examiner* — Jimmy T Nguyen
(74) *Attorney, Agent, or Firm* — Patrick M. Sheldrake

(57) ABSTRACT

An agricultural baler has a baling chamber with a plunger that is provided to reciprocally move in the baling chamber, the baling chamber walls separating the baling chamber from the environment, wherein the baling chamber walls include fluid channels formed at the environment side of the wall and directly adjacent to the baling chamber in such a manner that, during operation of the agricultural baler, heat is transferred from the baling chamber wall to fluid in the fluid channels, and the fluid is moved along said fluid channels during operation of the agricultural baler.

13 Claims, 5 Drawing Sheets

BALING CHAMBER

This application is the US National Stage filing of International Application Ser. No. PCT/EP2014/059749 filed on May 13, 2014 which claims priority to Belgian Application BE2013/0334 filed May 13, 2013, each of which is incorporated herein by reference in its entirety.

FIELD OF THE INVENTION

The present invention relates to an agricultural baler comprising a baling chamber, the baler comprising baling chamber walls separating the baling chamber from the environment.

BACKGROUND OF THE INVENTION

Agricultural balers are known in two types, a round agricultural baler and a square agricultural baler. The present invention is equally applicable to both the round and the square baler. The further explanation is given primarily for the square agricultural baler. However, a skilled person will readily understand how to apply the concepts explained with respect to the square baler, onto a round baler.

Agricultural balers are provided to gather crop material such as hay, straw or silage and compress the gathered crop material into a bale. To this end, a baler typically comprises a pre-compression chamber with an inlet and an outlet and a channel extending between the inlet and the outlet. The inlet of the pre-compressed chamber is connected to crop gathering means provided for gathering crop material and transferring the gathered crop material into the inlet of the pre-compression chamber. The pre-compression chamber forms slices of the gathered crop material. After a slice of crop material has been formed, it is transferred through the outlet of the pre-compression chamber into the baling chamber. A plunger reciprocally moves in the baling chamber thereby compressing the slices of crop material into a bale. The baler typically furthermore comprises knotting means for wrapping a string around the formed bale and connecting the ends of the string so that the bale is kept together after leaving the baler.

The baling chamber is defined by a plurality of baling chamber walls. A square baler comprises four baling chamber walls extending in the moving direction of the baler. A plunger is provided to reciprocally move between the four baling chamber walls at a front end of these baling chamber walls. Thereby, the plunger pushes a bale backwards in the baling chamber. The plunger exerts a force to the bale thereby both compressing the crop material into a firm package and moving the bale towards the end of the baling chamber where it can exit the baling chamber.

In order to build up pressure inside the baling chamber to compress the crop material into a bale with a pre-determined density, the baling chamber walls are formed so that the inner dimensions of the baler, at least over a part of the baling chamber length, taper towards a smaller dimension. As a result, a bale which is pushed through the baling chamber encounters an increasing frictional force. This increasing frictional force provides the backpressure that the plunger needs to obtain a bale with a pre-determined density.

Typically, square balers comprise movable wall sections, which are hinged to the baler frame in such a manner that the inner dimensions of the baling chamber can be changed by rotating the movable wall section around the hinges. Thereby, the amount of frictional force between the crop material in the baling chamber and the baling chamber walls can be regulated. Via these movable wall sections, the density of the bales can be regulated. The movable wall sections are typically moved by actuators that are connected to the movable wall section and that are powered via hydraulical or electrical systems to rotate the movable wall section around the hinge. Thereby, a controller steers the movable wall section to obtain a predetermined backpressure, which is a result of the frictional force between the crop material and the baling chamber walls.

A drawback of the known baler is that in certain situations, particularly in operating on a significantly hot day, considerably more energy is needed to obtain the required backpressure. This energy is put into the actuators for moving the wall segments towards one another in order to reduce the baling chamber diameter. By reducing the baling chamber diameter, the backpressure is increased.

With round balers, the crop material is also gathered by crop gathering means such as a pickup and transferred to the baling chamber. The round baler can have a baling chamber with a fixed diameter or with a variable diameter. In the case of a variable diameter, belts are used which constantly turn around to compress the material. When a new bale is being formed, the belts will run at a trajectory closer to the inlet of the baling chamber, while moving outwardly when the bale grows with the additional crop entering the baling chamber. The density is increased by additional tension on the belts which squeeze the bale radially. A baler having a fixed chamber will also be able to increase the density, by feeding more crop material into the baling chamber. By having more crop material for the same diameter, the density of the bale will increase.

For the round baler having a baling chamber with a variable diameter, as well as for the baler having a fixed baling chamber, the bale will be squeezed more and more radially. The bale however will try to expand axially which will increase the pressure against the walls of the bale forming chamber. The constant rotation of the bale against the walls of the forming chamber can create significant heat due to friction.

SUMMARY OF THE INVENTION

It is an object of the invention to provide a baler that can be economically operated in more weather conditions, particularly in hot weather conditions.

To this end, at least one of the baling chamber walls comprises fluid channels formed at the environment side of the wall and directly adjacent to the baling chamber in such a manner that, during operation of the agricultural baler, heat is transferred from the baling chamber wall to fluid in the fluid channels and in that the baler comprises displacement means for moving fluid along the fluid channels during operation of the agricultural baler.

The fluid channels and the displacement means provide in a mechanism to dissipate heat from the baling chamber walls. Particularly because the fluid channels are formed directly adjacent to the baling chamber, heat can optimally and without unnecessary resistance be transferred to the fluid in the fluid channels.

In the process of solving the objective technical problem, a surprising relationship was found between the heat that was cumulated in the baling chamber walls, and the maximum friction that could be obtained between the baling chamber wall and the bale. It appeared that when the baling chamber walls reach a temperature above a pre-determined temperature, the friction coefficient significantly decreases and as a result the necessary frictional force, in the case of the square baler needed to obtain the necessary backpressure, could not be reached.

Baling chamber walls are designed to resist high forces. To this end, the baling chamber walls for a square baler typically have a honeycombed structure or are formed multi-layered. Thereby, the baling chamber walls are typically surrounded by a cover for protecting the baling chamber wall elements against the environment. The combination of these elements results in baling chamber walls where heat is cumulated to such an extend that, in a warm environment, a conventional square baler cannot operate properly.

The baling chamber walls for a round baler are typically formed by means of a thick metal plate, which on one side is in direct contact with the rotating crop and on the other side in direct contact with the outer surface. In the event that the metal plates are not sufficiently able to transfer the heat which is generated by the friction of the rotating bale, e.g. due to already high environmental temperature the temperature of the harvested crop can reach a temperature above which the crop material will start to burn, resulting in a dangerous situation.

The baler as claimed in the present invention combines fluid displacement means and fluid channels so that heat can be transferred away from the baling chamber walls. As a result, heat will not be cumulated to the extend that the baler cannot operate properly anymore or that the crop material inside the baling chamber reaches a dangerous temperature level. Using the baler according to the invention, bales can still be pressed even in hot weather conditions.

Preferably, the fluid channels are formed directly adjacent at least 20% of the total surface of the baling chamber side of the at least one wall, preferably at least 40%, more preferably at least 60%. The higher the percentage of coverage with fluid channels, the more heat can be transferred away from the baling chamber walls. 20% of coverage has proven to be enough for most of the cases. Particularly when the 20% is chosen in an intelligent manner, meaning that those parts of the baling chamber wall where the most heat is cumulated are covered, 20% proves to be sufficient even for operating the baler in extremely hot weather condition. Preferably 40% of the baling chamber walls is covered with fluid channels, more preferably 60% is covered with fluid channels, so that a more even distribution of heat over the baling chamber walls can be obtained. By evenly distributing the heat, less tension due to heat variation occurs in the baling chamber wall.

Preferably the at least one baling chamber wall is formed with a metal plate, arranged with one side towards the baling chamber and with the other side towards the fluid channel. Metal plate allows a large surface to be covered. Therefore, such metal plate is particularly suitable for use as a baling chamber wall. With one side towards the baling chamber and the other side towards the fluid channel, the metal plate is provided to cover in a suitable manner a large surface while maintaining a sufficient heat dissipation via the fluid channels. Thereby, metal is known to have good heat dissipation characteristics.

Preferably the metal plate is provided at the other side with reinforcement ribs separating fluid channels from one another. The reinforcement ribs have two functions, one being reinforcing the metal plate against deformation, and the other being a cooling fin. Baling chamber walls are typically exposed to high transversal forces so that reinforcement is preferred to resist the forces. Heat dissipation is significantly improved by cooling fins. Thereby, the reinforcement ribs serve two purposes.

Preferably, the at least one of the baling chamber walls comprises at least two opposite baling chamber walls. By providing opposite baling chamber walls with fluid channels to dissipate heat from the baling chamber walls, a balanced distribution of heat and dissipation of heat is obtained through the baling chamber. As a result, the two opposite sides will be able to generate about the same friction and consequently a same backpressure. Thereby, symmetry of the bales can be maintained.

Preferably the fluid channels comprise an open side along the channel thereby forming a U-shape or L-shape in cross-section. Fluid can be guided easily along open fluid channels. Furthermore, the fact that the channels are open allows that heat is directly transferred via the fluid to the environment, thereby improving heat dissipation.

Preferably, the fluid is air and an end of the fluid channel opens into the environment. Air is generally available, clean, and easy to guide, and has an acceptable level of heat dissipation so that it is suitable for use and preferred to be used as cooling fluid in a baler.

Preferably, the baler comprises a cover for covering the baling chamber walls from the environment, the cover comprising a venting opening at the end of the fluid channel. The cover keeps the baling chamber walls protected from the environment and serves as a safety cover that prevents an operator or other person or animal coming in a close neighborhood of the baler, from being hurt by the baler mechanism. The cover comprises an opening so that the air flowing through the fluid channels and taking up heat from the baling chamber walls can leave the baler via the venting opening in the cover. Thereby, heat is efficiently transferred away from the baler.

Preferably, the displacement means are formed by at least one air scoop located with respect to the moving direction of the baler in such a manner that movement of the baler during operation forces environmental air into the air scoop and along the fluid channels. Thereby, the air scoop provides in a passive mechanism for displacing a fluid along the fluid channels. The air scoop catches environmental air, because, when the baler operates, the baler is typically moved over an agricultural field, thereby creating a relative speed between the baler (comprising the air scoop) and environmental air. Due to this relative speed, air is displaced throughout the baler and guided along the fluid channels in a passive manner (passing meaning that no powered mechanisms are used to displace the air inside the baler).

Preferably the fluid channels form a closed circuit and comprise a heat changer in the closed circuit for exchanging heat with an environment. Via a closed loop circuit, heat dissipation can be controlled in a precise manner. A closed loop furthermore allows other fluids than air to be used, so that a higher heat dissipation can be obtained. Via the heat exchanger, the temperature of the fluid inside the closed circuit can be optimized to obtain a predetermined heat dissipation. By controlling the heat dissipation, a pre-determined baling chamber wall temperature can be obtained.

Preferably the fluid is a liquid. A liquid has a much higher heat dissipation capacity than air, so that liquid is more suitable for use in a closed circuit to dissipate heat from the baling chamber walls.

Preferably the displacement means comprise at least one powered fan. A powered fan allows to regulate the amount of air that is displaced along the fluid channels, thereby regulating the amount of heat that is dissipated. With respect to passive displacement means, a powered fan can dissipate more heat because more air can be displaced and guided along the fluid channels. Such a displacement means are preferred for the round baler, since round balers have a discontinued baling process. When the bale is completely formed, the baler will stop such that the wrapping mechanism can wrap the formed bale with net or plastic, such that the bale can be ejected from the baling chamber. Due to this discontinued process, the air will not always be directed into the channels because the baler is no longer moving. Therefore, it is preferred to have e.g. a powered fan which will still blow air along and/or inside the fluid channels to continue to cool the baling chamber walls even when the baler is not moving.

Preferably the fluid channels are concentrated around hot spots in the at least one of the baling chamber walls. By selectively applying the fluid channels to specific zones in the baling chamber from which it is known that a lot of heat is generated in these zones, heat dissipation can be optimized.

Preferably the hot spots of the square baler baling chamber walls are located at a bended zone of the wall and at an actuator mounting zone of the wall where an actuator is mounted to the wall. The bending zone of the wall is known to be a zone where friction reaches a high level, and thus a lot of heat is generated. Also the zone of the wall where an actuator is mounted to the wall is known as a zone where a lot of friction is generated and consequently a lot of heat is generated.

For a round baler, new material will need to be brought into the baling chamber where material is already available and moving around. At the location where the new material is mingled or brought together with the material already available in the chamber, a lot of friction is generated and consequently heat is generated.

BRIEF DESCRIPTION OF THE DRAWINGS

The invention will now be described in more details with respect to the drawings illustrating some preferred embodiments of the invention. In the drawings.

In the drawings a same reference number has been allocated to a same or analogous element.

DETAILED DESCRIPTION OF PREFERRED EMBODIMENTS

Figure 1:
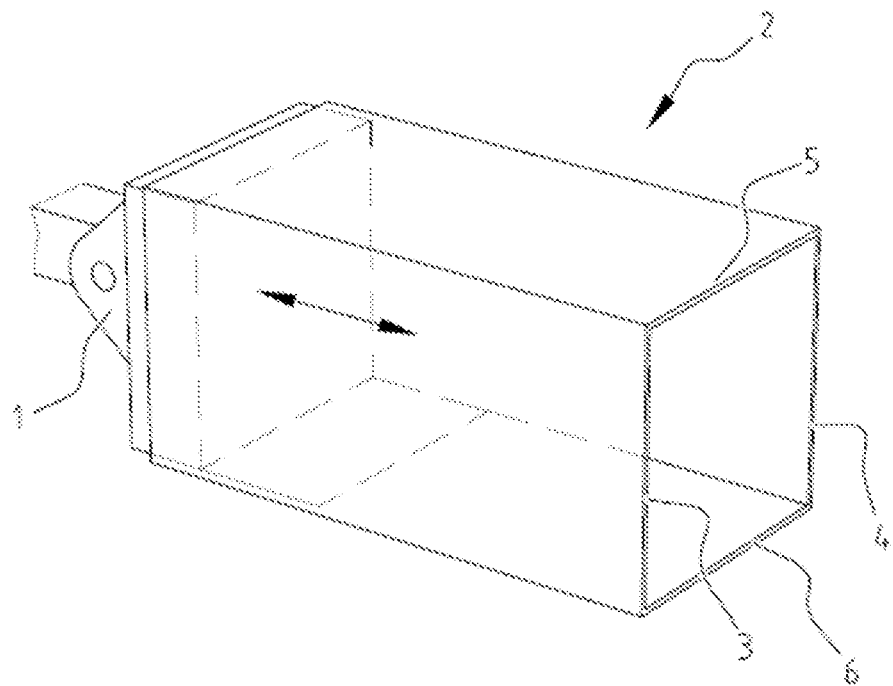
FIG. 1 shows a schematic representation of a baling chamber of a square baler.

FIG. 1 shows a schematic representation of a baling chamber 2 of a square baler comprising a plunger 1 that is provided to reciprocally move in the baling chamber 2. The baling chamber is defined by four walls, two side walls 3, 4, an upper wall 5 and a floor wall 6. Thereby the plunger is provided at a front end of the baling chamber and the opposite back end of the baling chamber is left open so that bales can leave the baling chamber via the open end. The baling chamber walls 3, 4, 5, 6 are formed so that the inner dimensions taper from the front end of the baling chamber to an intermediate segment of the baling chamber. After the intermediate segment, the inner dimensions stay about constant or taper a bit inward or outward toward the end of the baling chamber. This tapering is shown in an exaggerated manner (for clarity purposes) in FIG. 4.

The result of the tapering shape of the baling chamber, whereby the inner dimensions of the first segment of the baling chamber where the plunger reciprocally moves is larger than the inner dimensions at the intermediate section 8, is that the friction of a bale pushed through the baling chamber increases towards the intermediate section. This friction creates a backpressure that is necessary for the baler to be able to form a packages of crop material with a predetermined density.

Figure 2:
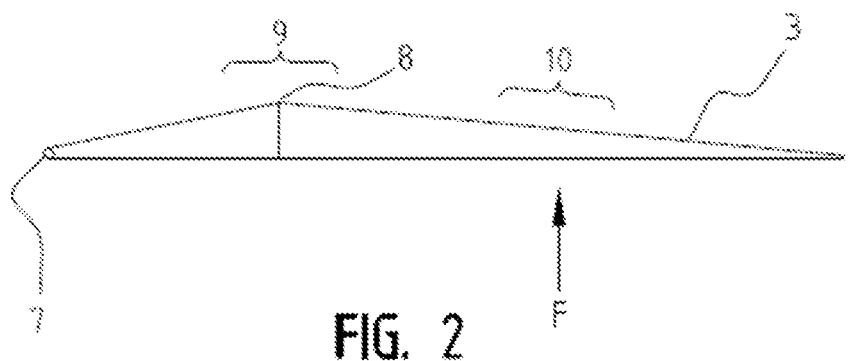
FIG. 2 shows a cross-sectional view of a baling chamber wall of a square baler.

FIG. 2 shows a cross-section of a side wall 3, and shows that the side wall has a bend 8. Typically the side wall is movable and therefore hinged to the baler via the front end 7 of the side wall 3. An actuator is provided to push the side wall inward with a force F to thereby amend the inner dimensions of the baling chamber. In this manner, the friction generated by the baling chamber walls to the bale can be regulated, and as a result the final density of the bale that is present in the baling chamber can be regulated. For example by pushing the movable wall 3 inward via the actuator, the inner dimensions of the baling chamber are reduced. To push a bale through the reduced baling chamber, a higher force is needed. As a result, the plunger 1 will exert a higher force in the baling chamber to push the bale forward in the baling chamber. By exerting a higher force, the bale is also compressed in a stronger manner, and a higher density is obtained.

Due to the shape and manner of suspending the movable wall section 3 in the baler, two hot spots can be identified on the baling chamber wall 3. A hot spot is a location on the baling chamber wall where heat accumulation is higher than average on the baling chamber wall. A first hot spot is located in the zone of the bend 8. This zone is indicated in FIG. 2 with reference number 9. This zone accumulates heat above average because in that zone the smallest inner dimensions of the baling chamber is reached. In this zone, the bale is pushed through "the bottle neck" of the baling chamber. A second hot spot can be found at the zone where the actuator is mounted to the movable wall section. This zone is indicated in FIG. 2 with reference number 10. In this zone, the actuator pushed the movable wall section 3 inward with a force F, thereby creating a frictional force at the zone 10 that is above average. As a result, heat is accumulated above average in this zone 10.

Figure 3A:
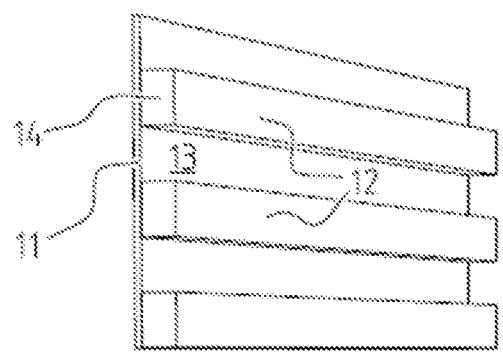
FIG. 3 shows reinforcement structures suitable for a baling chamber wall of a square baler according to the invention.
Figure 3B:
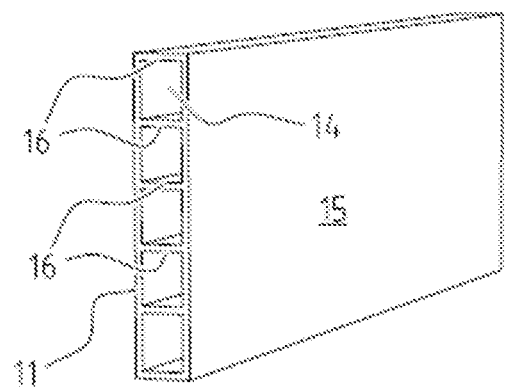
Figure 3C:
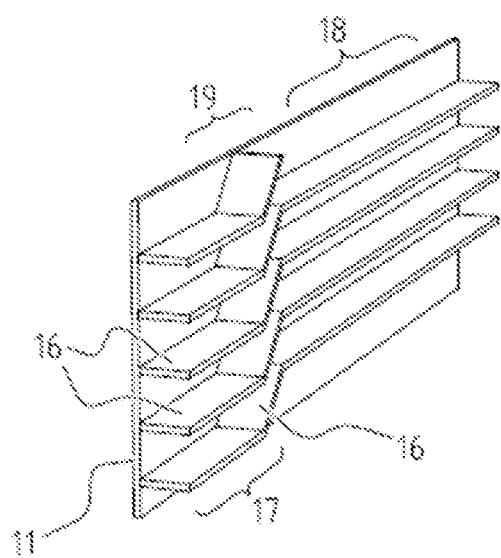

In FIGS. 3a, 3b, and 3c reinforcement structures for baling chamber wall are shown. FIG. 3a shows a metal plate 11 which is reinforced with reinforcement elements 12. Thereby, the flat side of the metal plate 11 is adapted to serve as inner wall of the baling chamber, while the reinforce side of the metal plate 11 is provided to point to the environment. The reinforcement elements 12 are formed as C-shaped or U-shaped profiles connected with their open end to the metal plate 11 thereby forming a closed channel 14. Alternatively, the reinforcement elements 12 are formed as tubes with a rectangular cross section, which tubes are connected with one side to the metal plate 1. The reinforcement structure of FIG. 3a can be used to dissipate heat in two manners. The reinforced wall shows two types of channels being an closed channel 14 and an open channel 13. Fluid can be forced to flow along the open channels 13, thereby dissipating heat from the baler wall. Otherwise, fluid can be forced through the closed channels 14 thereby dissipating heat from the baling chamber wall as well. Via closed channels 14, other fluids than air can be used, such as water or special coolants such as Betaine, polyalkylene glycol, freon, . . . . Other examples of coolants are R407C, R410A, R134A, R407F, Propane, Isobutane, Propylene, ammoniac, CO2, and Ethane. Preferably, the baling chamber wall is provided, at the fluid side, with a heat exchanging foil for enhancing exchange of heat with the fluid. Examples of such heat exchanging foils are Alufoil, copper foil and gold foil. For dissipating heat using open channels 13, air is preferred as heat dissipating fluid. Both the channels 13 and 14 are located directly adjacent the inner wall 11. Even when the reinforcement elements are formed as rectangular tubes mounted to the metal plate 11, still there is a close connection between the metal plate 11 and the one side of the tube 12, so that, from a heat transmission point of view, there is no noteworthy resistance between the metal plate 11 and the tube material. Thus also in such case, the channel 14 lays directly adjacent the inner wall 11.

FIG. 3b shows an alternative structure for reinforcing baling chamber walls. The figure shows the metal plate 11, which is reinforced via reinforcement ribs 16 extending from the inner wall 11, which reinforcement ribs 16 are, for strength purposes, overlaid with a second metal plate 15. In the configuration of FIG. 3b, no open channels are formed along which fluid can move. The metal plate 15 does not lay directly adjacent the metal plate 11 since there is a noteworthy resistance against the transmission of heat from the inner wall to the plate 15. Namely, the channels 14 isolate the metal plate 15 from the metal plate 11. Channels 14 between adjacent reinforcement ribs 16 form channels 14 through which fluid can be moved for heat dissipation purposes. When fluid flows through these channels 14, heat can be transferred directly from the metal plate 11 to the fluid in the channels 14. The reinforcement ribs 16 can extend in a straight line (as is shown in FIG. 3b), or can extend according to a predetermined pattern to obtain a predetermined strength profile.

FIG. 3c shows another reinforcement structure, whereby the metal plate 11 is solely provided with reinforcement ribs 16. Thereby, open channels are formed between adjacent reinforcement ribs 16, along which fluid can be moved to dissipate heat from the metal plate 11. The reinforcement ribs of FIG. 3c are formed in a predetermined pattern showing three segments 17, 18, 19. In a first segment, the reinforcement ribs extend in a first direction to thereby reinforce the metal plate 11 against deformation in the first direction. In a second segment 18, the reinforcement ribs extend in another direction to thereby provide a greater resistance against deformation of the metal plate 11 in another direction. In a third segment 19 the reinforcement ribs extend in yet another direction to prevent the wall segment from deforming in this other direction. Thereby, uninterrupted, sustained, fluid channels are formed which extend from a front end of the baling chamber wall to a back end of the baling chamber wall. These channels thereby allow fluid to move through the channels from the front end of the baling chamber wall to the back end of the baling chamber wall, thereby dissipating heat over substantially the complete length of the baling chamber wall. The channels can even be positioned such that e.g. the logo of the manufacturer is being showed, while still providing sufficient cooling of the baling chamber walls.

Another alternative embodiment is to use a special heat exchange sheet in combination with the ribs which are already available. Such sheet is placed on the outside of the bale chamber wall. This sheet is designed to transfer more quickly the heat originated inside the baling chamber and to transfer it via the ball chamber wall to the surroundings, thus preventing overheating of the bale chamber walls and also the interior of the baling chamber. When a structure as shown in FIG. 3b is used, a sheet can be placed on the wall of the baling chamber, whereby the sheet is facing the interior of the channels 14. A second sheet can be placed on the outside of the plate 15, now facing the outside environment. This will help in transferring the heat even more, since the transfer from the interior wall to the fluid inside the channels 14 will be done more optimal, and likewise, the transfer of heat from liquid to the wall 15 and the environment will be done more efficient.

Figure 4:
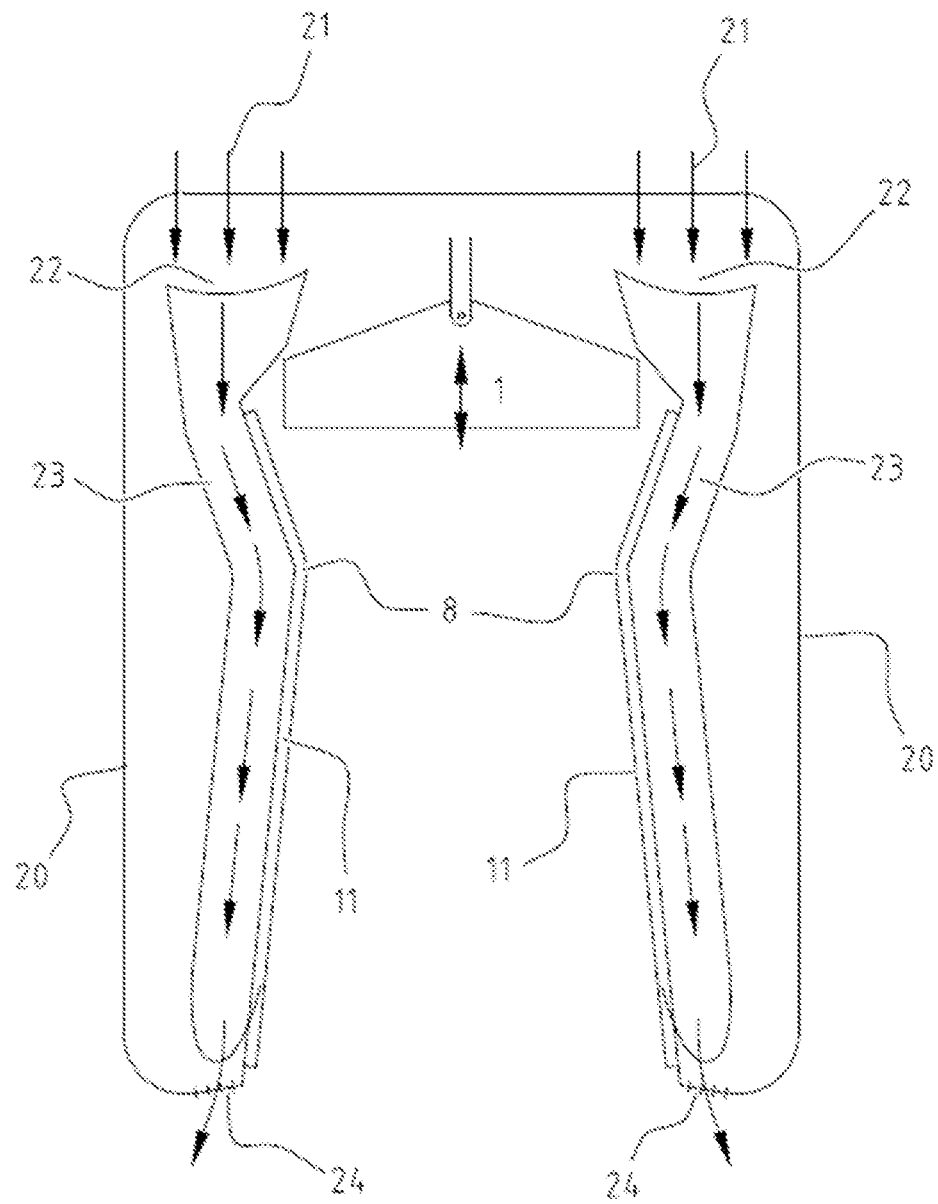
FIG. 4 shows a top view of a square baler according to an embodiment of the invention.

FIG. 4 shows a top view of a baler, whereby a first part of the baler is shown in a not intersected manner and the further part of the baler is shown in an intersected manner. FIG. 4 shows the plunger 1 provided for reciprocally moving in the baling chamber thereby pushing the bale through the baling chamber and compressing the bale. Furthermore, the figure shows the metal plates 11 forming the inner walls of the baling chamber, also shows the bend 8. The FIG. 4 further shows a cover 20 covering the baler thereby protecting the baling elements from the environment. The cover furthermore gives the baler its outer visual appearance. It also protects users, operators, or animals from being hurt by movements of baler elements. FIG. 4 shows how two air scoops 22 are formed in the baler cover. These air scoops are provided in such a manner that when the baler is operating, meaning that the baler is driven at a certain speed over a field, environmental air 21 is caught by the air scoops 22 and thereby forced through the baler. To this end, the air scoops 22 are connected to the fluid channels 23 which are located directly adjacent to the inner walls 11 of the baling chamber walls. Furthermore, at the back end of the baler cover, venting openings 24 are formed allowing the air flowing through the channels 23 to exit the baler. Thereby, a stream of fluid is created through the baler, which fluid can dissipate heat from the baler walls to the environment.

In the configuration of FIG. 4, air can be forced to flow through the fluid channels via passive displacement means or via active displacement means. Passive displacement means are provided to use the speed of the baler in operation to force air through the fluid channels. As shown in FIG. 4, the air scoops can be so formed and directed with respect to the moving direction of the baler that environmental air is caught by the air scoops due to the relative speed of the environmental air and the baler in operation, and furthermore forced to flow through the fluid channels. In another embodiment active displacement means are used, meaning that an air pump, such as a fan, is mounted in the fluid channels or in the air scoops to actively force environmental air to flow through the fluid channels. Thereby, a variety of configuration can be designed whereby one or several air pumps are used, whereby one or several air scoops are placed on the baler. For example, a skilled person can configure a conduit starting from a central air scoop, which conduit is branched to allow air to flow from the one air scoop towards two or more fluid channels to thereby dissipate heat from multiple baling chamber walls. Also in a configuration where air pumps are used to displace fluid through the fluid channels, the opening where the fluid enters the baler can be formed at a side wall, and needs no special shape for catching fluid. Also, the cleaning system which is used to clean the knotters of the square baler can be used. A part of the air which is available with the cleaning system can be diverted to the fluid channels, such that no additional system is needed.

Figure 5A:
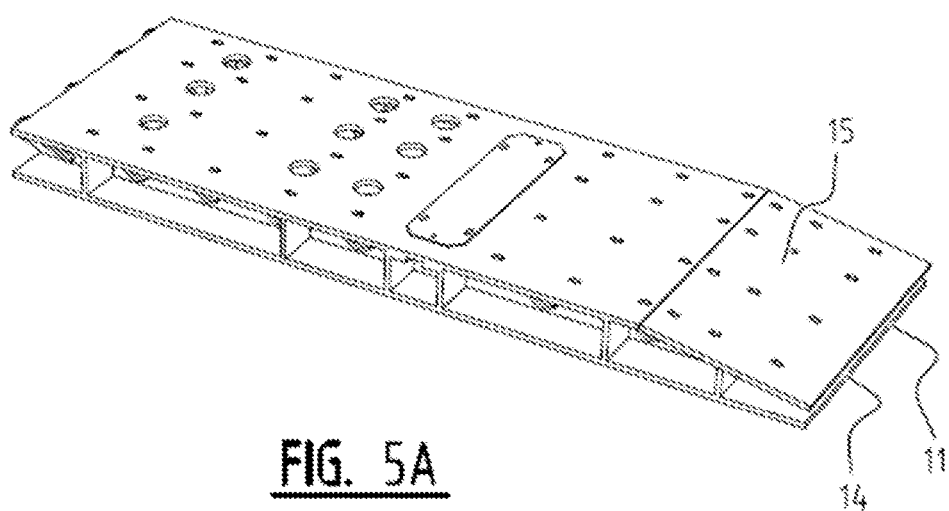
FIG. 5 shows an example of a reinforced wall suitable for use in the invention.
Figure 5B:
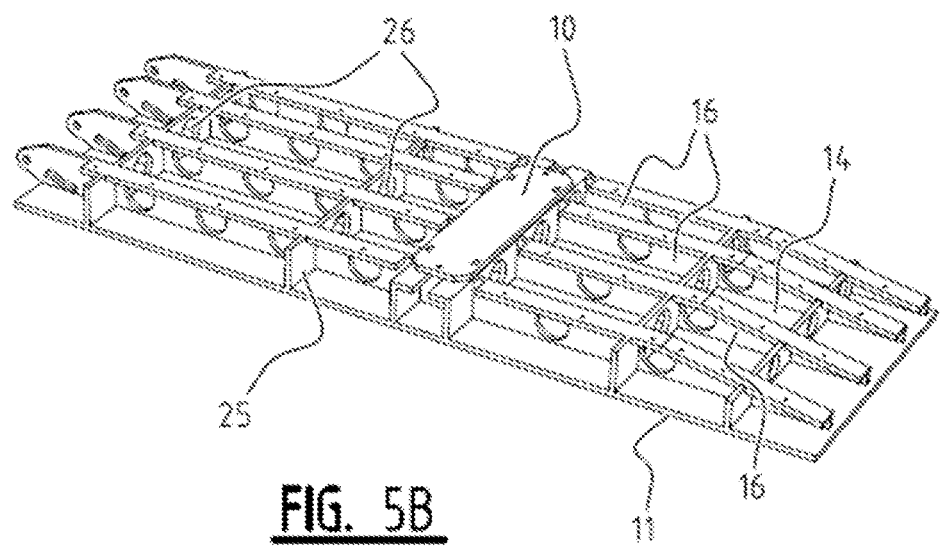

FIG. 5 shows an example of a movable wall that can be used as baling chamber wall and that comprises fluid channels. FIG. 5a shows the wall in its entirety whereas FIG. 5b shows the wall without the top metal plate, FIG. 5b being added for clarity and explanatory purposes. The figure shows a metal plate 11 that is provided with reinforcement ribs 16, upon which a second plate 15 is mounted. Between adjacent reinforcement ribs, fluid channels are formed. For strength purposes, transfers reinforcement ribs 25 are added. However, these reinforcement ribs, without special measurements, would block the fluid channels, so that fluid cannot flow through the channels. To this end, openings 26 are formed in the longitudinal reinforcement ribs. Openings can be formed, as shown in FIG. 5b, in the longitudinal reinforcement ribs as well as in the transfers reinforcement ribs so that a web of channels is formed in the baling chamber wall. Thereby, air can be forced to flow through the web of fluid channels thereby dissipating heat from the baling chamber wall 11 to the environment. These openings within the fluid channels can be selected such that a venture effect is created at specific locations, increasing the speed with which the hot air is evacuated and thus the level of cooling at specific points in the fluid channels.

Figure 6:
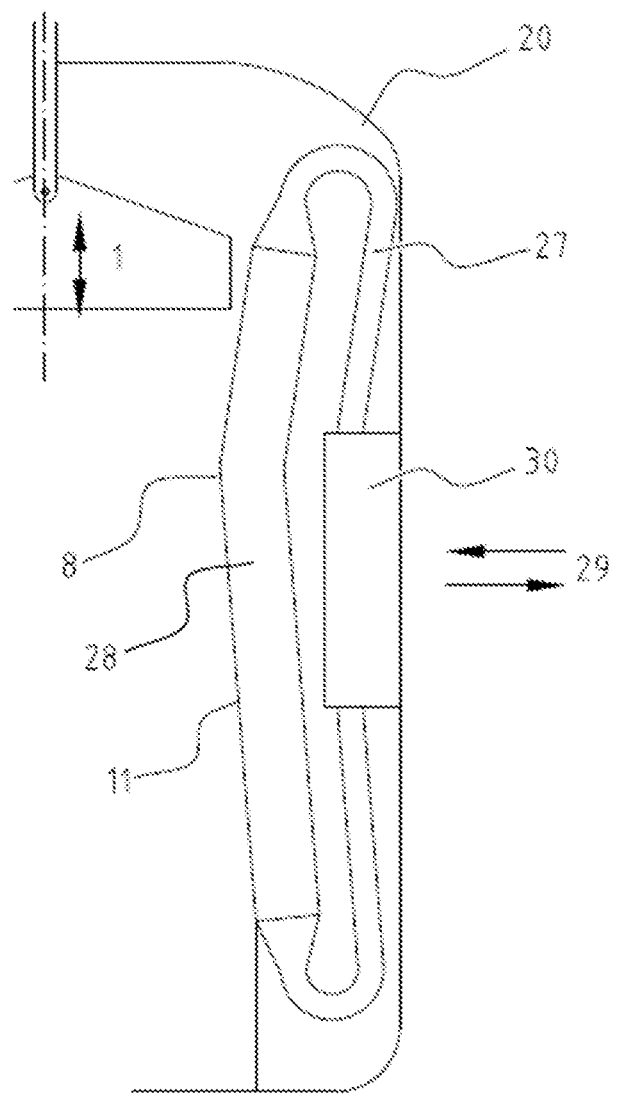
FIG. 6 shows a cross section of a square baler according to another embodiment of the invention.

FIG. 6 shows an alternative configuration whereby a closed circuit is provided to dissipate heat from the baling chamber wall 11. The figure shows part of a baler in cross section and shows the plunger 1, the inner wall of the baling chamber 11 with the bend 8. The figure furthermore shows the cover 20 covering the baler elements. To dissipate heat from the inner wall of the baling chamber 11, a closed circuit is provided with a closed fluid channel 28 linked via tubes 27 to a heat exchanger 30. By forcing fluid to flow through the closed channel, particularly through tube 27, through fluid channels 28 laying directly adjacent the baling chamber, and through the heat exchanger 30, heat can be exchanged 29 with the environment. Thereby heat can be transferred from the inner baling chamber wall 11 to the environment 29.

The invention claimed is:

1. An agricultural baler comprising:
   a baling chamber,
   baling chamber walls separating the baling chamber from an environment outside of the agricultural baler, at least one of the baling chamber walls having a baling chamber side and an environment side,
   wherein said at least one of the baling chamber walls comprises fluid channels formed at the environment side of the wall and directly adjacent to the baling chamber in such a manner that, during operation of the agricultural baler, heat is transferred from the baling chamber wall to fluid in the fluid channels, wherein an air source is positioned with respect to the channels for moving fluid along said fluid channels during operation of the agricultural baler, said at least one of the baling chamber walls is formed as a plate arranged with a first side towards the baling chamber and with a second side towards said fluid channels, and wherein said plate is provided at the second side with reinforcement ribs separating the fluid channels from one another.

2. The agricultural baler according to claim 1, wherein said fluid channels are formed directly adjacent at least 20% of the total surface of the baling chamber side of the at least one wall, preferably at least 40%.

3. The agricultural baler according claim 1, wherein the baling chamber walls comprise at least two opposite baling chamber walls.

4. The agricultural baler according to claim 1, wherein said fluid channels comprise an open side along the channel thereby forming a U-shape or L-shape in cross-section.

5. The agricultural baler according claim 1, wherein said fluid is air and wherein an end of said fluid channel opens into the environment.

6. The agricultural baler according to claim 5, wherein the baler comprises a cover for covering the baling chamber walls from the environment, the cover comprising a venting opening at the end of said fluid channel.

7. The agricultural baler according to claim 5, wherein the air source is formed by at least one air scoop located with respect to a moving direction of the baler in such a manner that movement of the baler during operation forces environmental air into the air scoop and along the fluid channels.

8. The agricultural baler according to claim 1, wherein the fluid channels form a closed circuit and comprise a heat exchanger in the closed circuit for exchanging heat with an environment.

9. The agricultural baler according to claim 8, wherein the fluid is a liquid.

10. The agricultural baler according to claim 1, wherein the fluid channels are concentrated around hotspots in the at least one of the baling chamber walls.

11. The agricultural baler according to claim 10, wherein the hotspots of the baling chamber walls are located at a bended zone or at an actuator mounting zone.

12. The agricultural baler according to claim 1, wherein the baler is a square baler.

13. The agricultural baler according to claim 1, wherein the baler is a round baler.

* * * * *